United States Patent Office 2,979,517
Patented Apr. 11, 1961

2,979,517

12α-FLUORO-16α-HYDROXY PREGNENES

Hershel L. Herzog, Mountain View, N.J., assignor to Schering Corporation, Bloomfield, N.J., a corporation of New Jersey No Drawing. Filed Feb. 21, 1957, Ser. No. 641,464

5 Claims. (Cl. 260—397.45)

This invention relates to a new group of steroid compounds which have powerful anti-inflammatory properties.

In particular, it has now been found that hydroxylation of certain well-known anti-inflammatory agents with the aid of suitable microorganisms transforms these steroidal compounds into agents of equal or superior anti-inflammatory potency, but possessing markedly diminished side-effects; in particular, diminished salt retention. For example, hydroxylation of 2-methyl-9α-fluoro-4-pregnene-11β,17α,21-triol-3,20-dione with the aid of an actinomycete species ATCC 11,009, affords a powerful anti-inflammatory substance, 2-methyl-9α-fluoro-4-pregnene-11β,16α,17α,21-tetrol-3,20-dione, useful in the therapy of rheumatoid arthritis and related collagen and allergic diseases. By the same method, 2-methyl-9α-fluoro-prednisolone, prepared according to the method described in application Serial No. 574,608, filed March 29, 1956, by Eugene P. Oliveto, has been converted into 2-methyl-9α-fluoro-16α-hydroxyprednisolone, 12α-fluoro-4-pregnene-11β,17α,21-triol-3,20-dione into 12α-fluoro - 4 - pregnene-11β,16α,17α,21-tetrol-3,20-dione and 12α-fluoroprednisolone into 12α-fluoro-16α-hydroxyprednisolone. The latter two starting materials may be prepared from the known 12α-fluorocortisone by methods well known in the art. Conversion of 12α-fluorocortisone to the 3,20-dissemicarbazone with semicarbazide, reduction of the 11-carbonyl group in the bissemicarbazone with sodium borohydride or lithium borohydride, and finally cleavage of the semicarbazones with pyruvic acid affords 12α-fluorohydrocortisone. Treatment of the latter with one of the many known 1-dehydrogenating microorganisms such as Corynebacterium simplex, Bacillus sphaericus or the like, yields 12α-fluoroprednisolone. All of these products are useful in the therapy of rheumatoid arthritis.

The method whereby actinomycete species ATCC 11,009 may be employed is described in detail in U.S. Patent No. 2,709,705. The procedure of Example 2 of that patent is well suited for the production of the compounds of this invention, preferably with the modifications indicated in the following illustrative examples. The purification of the crude reaction product is accomplished by chromatography on undiluted magnesium silicate and elution with mixtures of methylene chloride and methanol.

The 11β-hydroxy compounds obtained by this method can be converted into the corresponding 11-keto compounds by oxidation with chromic acid in acetic acid by the known technique. Prior to such oxidation hydroxyl groups in other positions than 11 should be protected by acylation.

As with other cortico-steroids, esterification at the 21-position is of value in extending the duration of activity, as for example with the acetates, propionates, isovalerates, enanthates and cyclopentylpropionates. Also valuable are the phenoxyacetates and substituted phenoxyacetates such as 4-chloro-, 2,4-dichloro-, 4-bromo-, 4-methyl-, 4-tert. butyl-, 2,4,5-trichloro-, and 4-methoxy-phenoxyacetates. Especially valuable are the furoates and substituted furoates including the 5-bromo-, 5-chloro-, 5-methyl-, 5-tert. butyl-furoates. Also water-soluble derivatives of the new compounds can be obtained by forming metal salts of monoesters of poly-functional acids such as succinates, phthalates, tricarballylates, itaconates, sulfates, phosphates, etc., as well as glycinate ester salts and gluconate esters.

The compounds may be administered orally or parenterally in the form of tablets, capsules, and aqueous or oil suspensions or solutions; or they may be applied topically in the form of lotions, ointments or suspensions.

The compounds of the invention may be represented by the general formulas

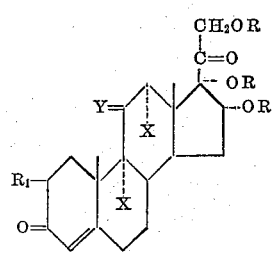

and

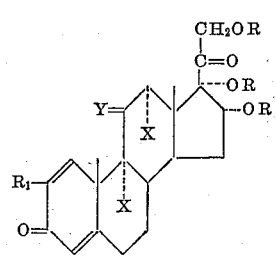

wherein one X is fluorine and the other X is hydrogen, Y represents

or =O, R represents a hydrogen or an acyl group, and $R_1$ represents hydrogen or methyl.

*Example 1*

2-methyl-9α-fluoro - 4 - pregnene-11β,16α,17α,21-tetrol-3,20-dione (I).—An aqueous medium of the following composition is prepared:

| | |
|---|---|
| Soybean oil _____ ml__ | 2.2 |
| Glycine _____ g__ | 2.6 |
| Sodium acid glutamate _____ g__ | 2.2 |
| FeSO₄.7H₂O _____ g__ | 0.025 |
| ZnSO₄.7H₂O _____ g__ | 0.03 |
| CuSO₄.5H₂O _____ g__ | 0.012 |
| Co(NO₃)₂.6H₂O _____ g__ | 0.005 |
| MnSO₄.4H₂O _____ g__ | 0.016 |
| CaCl₂.H₂O _____ g__ | 0.05 |
| MgSO₄.7H₂O _____ g__ | 0.5 |
| K₂HPO₄.3H₂O _____ g__ | 0.5 |
| Water _____ l__ | 1 |

The medium is distributed equally among ten 500 ml. flasks and the flasks and their contents are sterilized by autoclaving. To each flask is then added 25 mg. of 2-methyl-9α-fluoro - 4 - pregnene-11β,17α,21-triol - 3,20-dione in 2 ml. of methanol and a 2% inoculum of actinomycete ATCC 11,009. The flasks are incubated and shaken at 28° C. for 72 hours. The contents are then pooled, extracted five times with 1 l. portions of chloroform (total of 5 l.) and the extracts are pooled, washed with water, dried and concentrated. Chromatography of the concentrated solution on magnesium silicate (30 g.) and elution with successive 500 ml. portions of methylene chloride, 1% methanol in methylene chloride, 2% methanol in methylene chloride, 3% methanol, etc. and 4% methanol, etc. Unreacted starting material is eluted predominantly in the 2% methanol fractions and crystalline (I) is isolated from the 3% methanol fractions.

*Example 2*

2-methyl-9α-fluoro-16α-hydroxyprednisolone (II).—By the procedure of Example 1, 0.25 g. of 2-methyl-prednisolone is transformed in part into crystalline 2-methyl-9α-fluoro-16α-hydroxyprednisolone (II) which is isolated from the 3% methanol eluates.

*Example 3*

12α - fluoro-4-pregnene-11β,16α,17α,21 - tetrol - 3,20-dione (III).—By the procedure of Example 1, 0.25 g. of 12α-fluoro-4-pregnene-11β,17α,21-triol-3,20-dione is transformed in part into crystalline 12α-fluoro-4-pregnene-11β,16α,17α,21-tetrol-3,20-dione (III) which is isolated from the 3% methanol eluates.

*Example 4*

12α-fluoro - 16α - hydroxyprednisolone (IV).—By the procedure of Example 1, 0.25 g. of 12α-fluoroprednisolone is transformed in part into crystalline 12α-fluoro-16α-hydroxyprednisolone (IV) which is isolated from the 3% methanol eluates.

The starting materials for Examples 3 and 4 may be made as follows:

12α - fluorocortisone 21-acetate bissemicarbazone.—To a solution of 3.5 g. of 12α-fluorocortisone 21-acetate in 450 ml. of methanol is added a solution of 8.0 g. of semicarbazide hydrochloride in 40 ml. of water and 6.2 g. of pyridine. The reaction mixture is refluxed overnight, then 360 ml. of solvent is removed by distillation and 360 ml. of water is added. The reaction mixture is cooled to 0° C. for one hour, the precipitate is removed by filtration and washed with water. There results 3.8 g. of solid bissemicarbazone.

12α - fluorohydrocortisone bissemicarbazone.—A mixture of 1.0 g. of the product of the previous example in 100 ml. of dioxane and 50 ml. of water containing 1.0 g. of sodium borohydride is stirred at 25° C. for 24 hours. The reaction mixture is neutralized with acetic acid and concentrated to a small volume in vacuo. Water is then added portionwise until precipitation is complete and the resulting solid is removed by filtration. There results ca. 0.8 g. of 12α-fluorohydrocortisone bissemicarbazone.

An alternate procedure for the preparation of the product of this example is as follows: A mixture of 1.0 g. of 12α-fluorocortisone 21-acetate bissemicarbazone in 100 ml. of anhydrous tetrahydrofuran and 1.0 g. of lithium borohydride is stirred at room temperature for 24 hours. The reaction mixture is concentrated in vacuo, neutralized with acetic acid, and diluted with water. The product is separated from the aqueous mixture by filtration, affording 0.78 g. of the bissemicarbazone.

12α-fluorohydrocortisone.—To a mixture of 1.0 g. of the product of the preceding example in 25 ml. of acetic acid and 5 ml. of 1 N aqueous sodium acetate is added 2.0 g. of 91% pyruvic acid. The resulting mixture is refluxed for 15 minutes, cooled, diluted with 500 ml. of water and allowed to stand overnight. The reaction products are separated by extraction with ethyl acetate. The ethyl acetate solution is washed with water and aqueous sodium bicarbonate, dried over magnesium sulfate and concentrated to a small volume from which the 12α-fluorohydrocortisone crystallizes, affording 0.45 g. of solid.

12α-fluoroprednisolone.—To 100 ml. of a growing culture of *B. sphaericus* prepared as described in application Serial No. 570,210, filed March 8, 1956, by Charney et al., contained in a 300 ml. shake flask is added 50 mg. 12α-fluorohydrocortisone in 3 ml. of methanol. The mixture is incubated and shaken at 28° C. for 24 hours, whereupon the product is extracted with chloroform, the extracts are washed with water, dried and concentrated to a small volume. On dilution of the solution with ether crystallization of 12α-fluoroprednisolone results. Filtration of the solid affords 23 mg. of the desired product.

I claim:

1. 12α - fluoro - 4 - pregnene - 11β,16α,17α,21-tetrol-3,20-dione.
2. 12α-fluoro-16α-hydroxyprednisolone.
3. Compounds of the group consisting of 12α-fluoro-4-pregnene-11β,16α,17α,21-tetrol - 3,20 - dione and 12α-fluoro-16α-hydroxyprednisolone and their lower alkanoic acid 21-esters.
4. Compounds of the general formula:

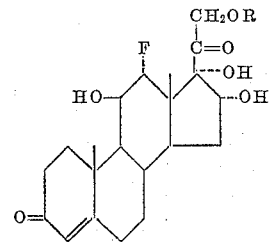

in which R represents a member of the group consisting of hydrogen and lower alkanoyl radicals.

5. Compounds of the general formula:

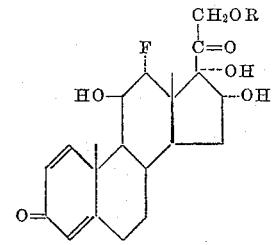

in which R represents a member of the group consisting of hydrogen and lower alkanoyl radicals.

References Cited in the file of this patent

UNITED STATES PATENTS

| | | |
|---|---|---|
| 2,773,080 | Bernstein et al. | Dec. 4, 1956 |
| 2,789,118 | Bernstein et al. | Apr. 16, 1957 |
| 2,822,318 | Kroll et al. | Feb. 4, 1958 |
| 2,831,003 | Thomas | Apr. 15, 1958 |